April 9, 1963
R. H. BEYER
3,084,597
EXPLOSIVE QUICK-DISCONNECT
Filed Jan. 11, 1961
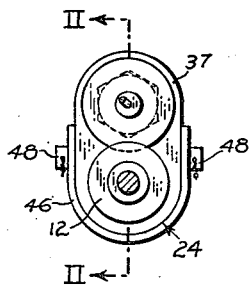
Fig. 1
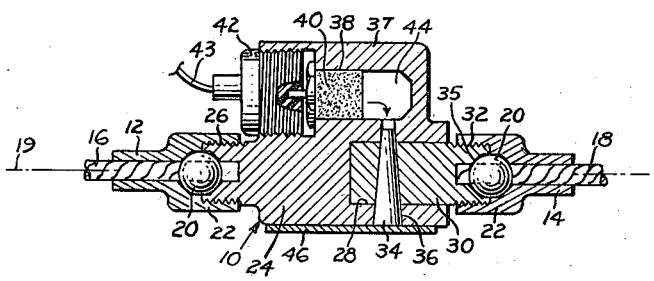
Fig. 2
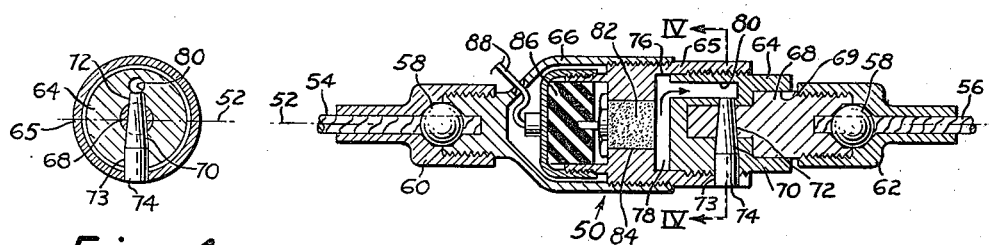
Fig. 4
Fig. 3
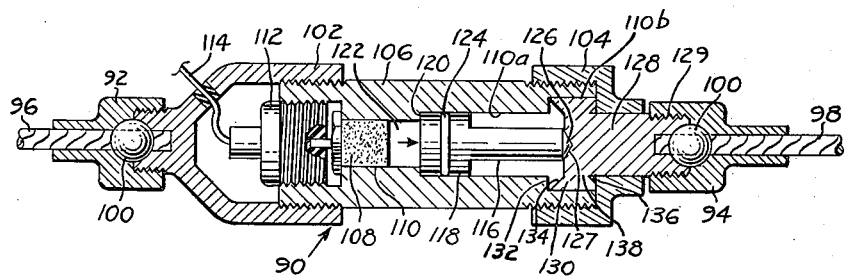
Fig. 5
INVENTOR.
RAYMOND. H. BEYER
BY
George J. Rubens
ATTORNEY United States Patent Office … 3,084,597
Patented Apr. 9, 1963

3,084,597
EXPLOSIVE QUICK-DISCONNECT
Raymond H. Beyer, Fort Worth, Tex., assignor, by mesne assignments, to the United States of America as represented by the Secretary of the Navy
Filed Jan. 11, 1961, Ser. No. 82,142
2 Claims. (Cl. 89—1)

This invention relates to quick-disconnects for cables, tubes, wires and like elements, and more particularly to such a disconnect that is explosively actuated to unlock the connected elements.

The advent of high-speed and high-altitude performance aircraft has initiated the need for designing future aircraft with an escape capsule for the manned portion, which capsule can be separated from the parent aircraft and parachuted to safety.

It has been proposed that the escape capsule be a forward manned portion of the aircraft generally similar to the conventional cockpit, and be integrally connected to the parent aircraft. Means are provided for separating the capsule from the parent aircraft frame upon a predetermined event or signal which forms no part of this invention. However, separation of the escape capsule creates a need for separating the various aircraft controls, which controls of necessity extend between the separable portions of the aircraft, and it is to this problem that the present invention is directed.

Several ways of severing cables, etc. are available. Most common are the guillotine or ballistic cable cutter which utilize an anvil. These devices are inadequate for the present contemplated use for several reasons. First, the weight is excessive, and the size and shape creates a serious location and attachment problem. Probably more serious, as many of the controls travel in two planes, vertically and horizontally, it is difficult to find a satisfactory method to hold the cables firmly against the anvil of the guillotine so that the choppers can satisfactorily sever the cables.

The present invention accomplishes the desired result of disconnecting the cable elements without the disadvantages of the prior art devices. The quick-disconnect comprises two halves in which the respective ends of the cable are anchored. The other ends of the connector halves are secured together through a body member and a retainer member which are separated by an explosive charge to free the connector halves and the cable to which they are attached.

A principal object of this invention is to provide a quick-disconnect which is lightweight, compact and instantly operable to separate the connected elements; and a corollary object is to provide such a quick-disconnect that forms a part of the connected elements, and, therefore does not require any stationary support, such as an aircraft bulkhead.

Other objects and many of the attendant advantages of this invention will be readily appreciated as the same become better understood by reference to the following detailed description when considered in connection with the accompanying drawings wherein:

FIG. 1 is an end elevation view of one embodiment of the quick-disconnect of this invention;

FIG. 2 is a longitudinal sectional view of the quick-disconnect of FIG. 1 taken along line II—II;

FIG. 3 is a longitudinal sectional view of another embodiment of the invention;

FIG. 4 is a transverse section taken along line IV—IV of FIG. 3; and

FIG. 5 is a longitudinal section of still a third embodiment of the invention.

Referring to the drawings where like reference numerals refer to similar parts throughout the figures, there is shown in FIGS. 1 and 2 a quick-disconnect 10 comprising a body formed of two open-ended ferrule members 12 and 14 through which freely pass the respective elongate elements 16 and 18 lying in a longitudinal axis 19 passing through disconnect 10. The elongate elements to be connected may be cables, rods, tubes, wires and the like, hereinafter, generally referred to in this specification as cables. After threaded through the ferrules, each cable has swaged thereto at one end a bead 20 adapted to be seated within an enlarged portion 22 of the respective ferrule members. Each bead prevents the cable from being pulled through its respective ferrule, while permitting relative rotation between the cable and the ferrule during assembly of the connector components to be described.

A disconnect body member 24 is threaded or otherwise secured at 26 to ferrule member 12, the other end of the body being provided with a socket or recess 28 adapted to slidably receive one end of a mating retainer member 30 secured at the other end at 32 to ferrule member 14. Recess 28 and retainer member 30 are preferably disposed symmetrically about axis 19 passing through the cables. A removable tapered pin 34 is housed within a corresponding tapered hole 36 extending through both the body member and the retainer member to provide a positive connection between the members, and between the cables to which they are attached. Body member 24 and retainer member 30 may be recessed at 35 to seat a portion of the respective beads 20 wherein the disconnect can be clamped to the cables by tightening of the members on the ferrules.

In the embodiment of FIGS. 1 and 2, body 24 is laterally extended at 37 to provide a cavity 38 on the same side of the disconnect as the narrow end of pin 34, to house a conventional explosive initiator 40. At one side the initiator is connected by an electrical connector 42 and conductors 43 to an electrical firing circuit, not shown. Initiator 40 is spaced from the end of cavity 38 to provide a chamber 44 leading to tapered hole 36, whereby the explosive blast of gas entering chamber 44 acts uopn the small end of tapered pin 34 to eject it free of the slot thereby disconnecting body 24 and retainer 30. A U-shaped pin retainer 46, in form of a plastic or soft metal sheet, is partially wrapped around body 24 and secured a pair of stubs 48 mounted on the body. Retainer 46 keeps pin 34 in a normally assembled position until shattered by pin 34 as it is ejected by the gas pressure.

A modified quick-disconnect 50 is shown in FIGS 3 and 4, differing from disconnect 10 of FIGS. 1 and 2 primarily in that the initiator is symmetrically arranged with respect to a longitudinal axis 52 passing through cables 54 and 56. As in the first modification, each elongate element is anchored by a bead 58 to a respective open-ended ferrule members 60 and 62. Disconnect body member 64 is threadedly connected to ferrule member 60 via an intermediate sleeve member 65 and an end sleeve member 66, and at the other disconnect half, retainer member 68 is connected to ferrule member 62; the various connections between the members being threaded joints or other conventional means. Retainer 68 is seated within a body member recess 69 and is detachable secured therein by a tapered pin 70 fitting in a corresponding tapered hole 72 that extends transversely through the mated parts. Pin 70 occupies only a portion of the length of hole 72 leaving a uniform diameter portion 73 adjacent the enlarged end to accommodate a plug 74 which normally retains the plug in the engaged position until ejection occurs in a manner to be described.

Body member 64 is threaded within sleeve member recess 76 short of the end thereof leaving a chamber 78. A longitudinally-drilled passage 80 offset from axis 52 extends from chamber 78 to communicate with the narrow end of hole 72. An initiator 82, similar to initiator 40 of FIG. 1, is centrally supported in sleeve member 65 in a longitudinally-drilled aperture 84 open to chamber 78, the initiator being actuated by a connector 86 secured on the other end of the sleeve member. Conductors 88 extend through end sleeve member 66 to connect the initiator in a suitable firing circuit, not shown.

Operation of the disconnect modification of FIGS. 3 and 4 is similar to the disconnect of FIGS. 1 and 2. Ignition of initiator 82 creates a gas blast in chamber 78 which enters passage 80 and applies a force on the small end of pin 70 sufficient to eject both the pin and plug 74 from the respective holes to unlock body member 64 and retainer. Thereafter any slight tension on cables 54 and 56 will separate the members.

Still another modified quick-disconnect 90 is shown in FIG. 5 differing from disconnect 30 of FIG. 3 in that the explosive force is used to shear one of the members instead of ejecting a pin. Disconnect 90, as in the prior modifications, includes a pair of ferrules 92 and 94 anchored to cables 96 and 98, respectively, by swaged beads 100. A pair of sleeve members 102 and 104 are threadedly or otherwise secured to ferrules 92 and 94, respectively and threadedly connected together by a central tubular body member 106. An initiator 108 is housed in one end of body member bore 110 connected by connector 112 and conductors 114 to a suitable firing circuit, not shown. A plunger 116 is slidably fitted into an enlarged bore portion 110a, the head 118 of the plunger at one end being spaced from the initiator by a shoulder 120 to provide a chamber 122. Plunger head 118 is provided with a suitable sealing ring 124 to provide a gas-tight slidable joint within bore 110a. Plunger 116 terminates in a conical-shaped end 126 which is adapted to seat in a correspondingly shaped recess 127 in a holder 128. A portion of holder 128 passes freely through sleeve member 104 and is threaded at 129 at the opposite end to ferrule 94. Holder 128 is provided with an integral enlarged annular ring portion 130 which is clamed in a bore portion 110b, against a shoulder 132 by sleeve 104. The faces of ring portion 130 are machined with a flared lip 134 and a V-shaped groove 136 forming therebetween a weakened narrow-neck portion 138.

Ignition of initiator 108 at the predetermined time creates a build-up of gas pressure in chamber 122 which acts on plunger head 118 against holder 128 until the pressure is sufficient to shear ring 130 from holder 128 along the neck portion 138. Fracturing of the ring occurs inwardly of the holder along the surfaces 134 and 136 as a continuation of the grooves so that the remainder of the holder is free of any projections that might retard its ejection through sleeve member 104 to separate the disconnect and the cables 96 and 98 connected thereby.

The connectors of the present invention provide an instant and positive means for separating elements, such as cables or the like. The disconnect does not require any stationary mounting as it forms a part of the elements to be connected.

Obviously many modifications and variations of the present invention are possible in the light of the above teachings. It is therefore to be understood that within the scope of the appended claims the invention may be practiced otherwise than as specifically described.

I claim:
1. A cable quick-disconnect for a pair of cables having free ends, a ferrule for anchoring therein each of said cable ends, a retainer member threadedly secured at each outer end to a respective ferrule, one of said retainers terminating at an inner end in an enlarged hollow portion, a hollow casing threaded at one end to said hollow portion and housing an explosive initiator, an inner end of the other retainer member having a weakened peripheral projection, a sleeve threaded to another end of the casing and having a shoulder engaging said peripheral portion for securing the retainer to the casing, a plunger slidably mounted within the casing adjacent the gas initiator, said plunger being responsive to the gas pressure generator by said initiator for shearing off said projection and releasing said cable ends.

2. The cable quick-disconnect of claim 1 wherein the retainer members engage said cable ends to restrain inward movement thereof.

References Cited in the file of this patent
UNITED STATES PATENTS

| | | |
|---|---|---|
| 2,421,807 | Richey et al. | June 10, 1947 |
| 2,489,984 | Shoemaker | Nov. 29, 1949 |
| 2,650,127 | Carlson | Aug. 25, 1953 |
| 2,883,910 | Nessler | Aug. 28, 1959 |
| 2,905,491 | Olson | Sept. 22, 1959 |
| 2,949,822 | Musser | Aug. 23, 1960 |